US011912443B2

United States Patent
Mun et al.

(10) Patent No.: US 11,912,443 B2
(45) Date of Patent: Feb. 27, 2024

(54) FILM WRAPPING MACHINE FOR PRODUCT PACKING DEVICE USING STRETCH FILM

(71) Applicant: YULWON ENGINEERING CO., LTD., Gwangju (KR)

(72) Inventors: Chang-Sik Mun, Gwangju (KR); Young-Woo Park, Jangseong-gun (KR); Sung-Jin Kim, Gwangju (KR)

(73) Assignee: YULWON ENGINEERING CO., LTD., Gwangju (KR)

( * ) Notice: Subject to any disclaimer, the term of this patent is extended or adjusted under 35 U.S.C. 154(b) by 0 days.

(21) Appl. No.: 17/719,736

(22) Filed: Apr. 13, 2022

(65) Prior Publication Data

US 2022/0332450 A1  Oct. 20, 2022

(30) Foreign Application Priority Data

Apr. 16, 2021  (KR) .................. 10-2021-0050061

(51) Int. Cl.
*B65B 11/58* (2006.01)
*B65B 11/02* (2006.01)
*B65B 53/02* (2006.01)
*B65H 16/02* (2006.01)
*B65H 20/16* (2006.01)
*B65H 35/00* (2006.01)

(52) U.S. Cl.
CPC ............ *B65B 11/025* (2013.01); *B65B 11/58* (2013.01); *B65B 53/02* (2013.01); *B65H 16/021* (2013.01); *B65H 20/16* (2013.01); *B65H 35/0073* (2013.01); *B65H 2301/4472* (2013.01); *B65H 2801/81* (2013.01)

(58) Field of Classification Search
USPC ............................................. 53/399
See application file for complete search history.

(56) References Cited

U.S. PATENT DOCUMENTS

2002/0170270 A1\* 11/2002 Borchard ................ B65B 9/135
53/567
2007/0051075 A1\* 3/2007 Chiu Chen ............. B65B 9/135
53/577

(Continued)

FOREIGN PATENT DOCUMENTS

KR  10-2000-0069218   11/2000
KR  10-2012-0050630    5/2012

*Primary Examiner* — Chinyere J Rushing-Tucker
(74) *Attorney, Agent, or Firm* — LEX IP MEISTER, PLLC

(57) ABSTRACT

The present invention relates to a film wrapping machine for a product packing device using a stretch film, including a frame having vertical bars extending upward and spaced apart from each other, a film clamping unit including a pair of suction pads which are moved in a direction of being spaced apart from each other in a state of adsorbing the stretch film so that a front end portion of the stretch film supplied from a film supply device is opened, and a plurality of clamps configured to grip the front end portion of the stretch film opened by the suction pads, receive the stretch film whose upper end is cut and bonded by the film supply device in a wrinkled state, and process the stretch film to be covered on a product in a process of lowering the vertical bars, and a controller which controls operation of the film clamping unit and the film supply device.

4 Claims, 18 Drawing Sheets

(56) References Cited

U.S. PATENT DOCUMENTS

| | | | |
|---|---|---|---|
| 2013/0167488 A1* | 7/2013 | Kim | B65B 53/02 |
| | | | 53/557 |
| 2014/0102046 A1* | 4/2014 | Tellen | B65B 9/135 |
| | | | 53/461 |
| 2017/0073092 A1* | 3/2017 | Bocedi | B65B 59/003 |
| 2019/0152632 A1* | 5/2019 | Lorenzen | B65B 9/135 |
| 2021/0188467 A1* | 6/2021 | Bocedi | B65B 51/10 |
| 2021/0354861 A1* | 11/2021 | Konstmann | B65B 11/025 |

* cited by examiner

FILM WRAPPING MACHINE FOR PRODUCT PACKING DEVICE USING STRETCH FILM

CROSS-REFERENCE TO RELATED APPLICATION

This application claims priority to and the benefit of Korean Patent Application No. 10-2021-0050061, filed on Apr. 16, 2021, the disclosure of which is incorporated herein by reference in its entirety.

BACKGROUND

1. Field of the Invention

The present invention relates to a film wrapping machine for a product packing device using a stretch film, and more particularly, to a film wrapping machine for a product packing device using a stretch film, which is capable of wrapping and packing a product with a stretch film.

2. Discussion of Related Art

Products for sale, such as refrigerators and dryers, are generally packed in boxes made of paper to protect products during transportation.

However, in the case of packing using boxes made of paper, because of using wood, which is a raw material of paper, there is a high risk of damage to nature, and the cost is relatively high, resulting in an increase in costs, after distribution of products is completed, processing difficulties and collection costs increase due to the volume of packing materials, the cost of recycling after the collection increases, and there is a difficulty in inventory management for each specification due to the manufacturer's marketing of small quantities and multiple products.

In order to overcome the disadvantages of packing using boxes made of paper as described above, a packing device to which a heat-shrinkable film is applied has been proposed in Korean Laid-open Patent Publication No. 10-2000-0069218 and Korean Laid-open Patent Publication No. 10-2012-0050630. However, in the case of the heat-shrinkable film, since a process of heat-treating the heat-shrinkable film so as to be heat-shrunk is required after a process of wrapping a product in the heat-shrinkable film, there is a disadvantage in that a packing process is complicated.

SUMMARY OF THE INVENTION

The present invention is directed to solving the above problems, and providing a film wrapping machine for a product packing device using a stretch film, which supports to perform a packing processing operation for products without a separate heat shrink treatment process using a stretchable material.

According to an aspect of the present invention, there is provided a film wrapping machine for a product packing device using a stretch film, which covers a product with the stretch film supplied from a film supply device which has both side surfaces folded inward to have a flat band shape so that an inner space is formed in a longitudinal direction, and supplies a tube-shaped stretch film, the film wrapping machine including a frame having vertical bars extending upward and spaced apart from each other such that a lower portion thereof has a movement permissible space in which a product to be wrapped is introduced, a film clamping unit including a pair of suction pads which are moved in a direction of being spaced apart from each other in a state of adsorbing the stretch film by vacuum pressure so that a front end portion of the stretch film supplied from the film supply device is opened, and a plurality of clamps configured to grip the front end portion of the stretch film opened by the suction pads, receive the stretch film whose upper end is cut and bonded by the film supply device in a wrinkled state, and process the stretch film to be covered on a product in a process of lowering being lowered along the vertical bars, and a controller configured to control operation of the film clamping unit and the film supply device so that the clamps of the film clamping unit are lowered along the vertical bars in a state in which the clamps grip the stretch film and the clamps are raised along the vertical bars in a state in which the gripping of the stretch film is released.

The film clamping unit may include a pair of lifting and lowering support plates each coupled to one of the vertical bars to be lifted or lowered, a pair of first horizontal moving plates mounted movably on the lifting and lowering support plates in opposite directions to each other in a first horizontal direction, and a second horizontal moving plate mounted movably on the first horizontal moving plates in a second horizontal direction orthogonal to the first horizontal direction, wherein the clamps may each include at least one inner finger roller rotatably mounted to be brought into contact with an inner surface of the stretch film opened at an upper end of the inner support plate extending vertically from an end edge of the second horizontal moving plate, a rotating piece having a lower portion which is hinge-coupled to the second horizontal moving plate at a position spaced apart from the inner support plate and is installed to be rotated in a direction of being brought into contact with or separated from the inner finger roller, a gripping roller which is rotatably coupled to the rotating piece and is brought into contact with or separated from the inner finger roller, a gripping drive motor configured to drive the gripping roller to be rotated forward and backward, and a clamping cylinder having a rod that is moved forward or rearward so as to rotate the rotating piece in a direction in which the gripping roller is brought into contact with the inner finger roller or in a direction in which the gripping roller is separated from the finger roller and that is coupled to the rotating piece.

The inner support plate may be formed to have a curved portion extending to have an arc-shaped curvature so that a separation distance from the gripping roller is further increased as a portion is further away from a central portion, on which the inner finger roller is mounted, toward both sides.

The inner finger roller may include an upper inner finger roller rotatably mounted to be brought into contact with the inner surface of the stretch film opened at the upper end of the inner support plate extending vertically from the end edge of the second horizontal moving plate, and a lower inner finger roller rotatably mounted on the inner support plate at a position spaced downward from the upper inner finger roller, wherein the rotating piece may include a main rotating piece having a lower portion hinge-coupled to the second horizontal moving plate and extending upward, and a sub-rotating piece connected to a rod of a lifting and lowering cylinder so as to be vertically movable with respect to the main rotating piece, the gripping drive motor and the gripping roller may be mounted on the sub-rotating piece, and the controller may control the clamping cylinder so that all of the gripping roller and the upper and lower inner finger rollers are brought into contact with each other when the gripping roller is rotated so that the stretch film is accommodated under the inner finger roller in a wrinkled manner, and controls the lifting and lowering cylinder so that only the gripping roller and the upper inner finger roller are brought into contact with each other in a process of covering the products with the stretch film in the process of being lowered along the vertical bars.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, a film wrapping machine for a product packing device using a stretch film according to exemplary embodiments of the present invention will be described in more detail with reference to the accompanying drawings.

Figure 1:
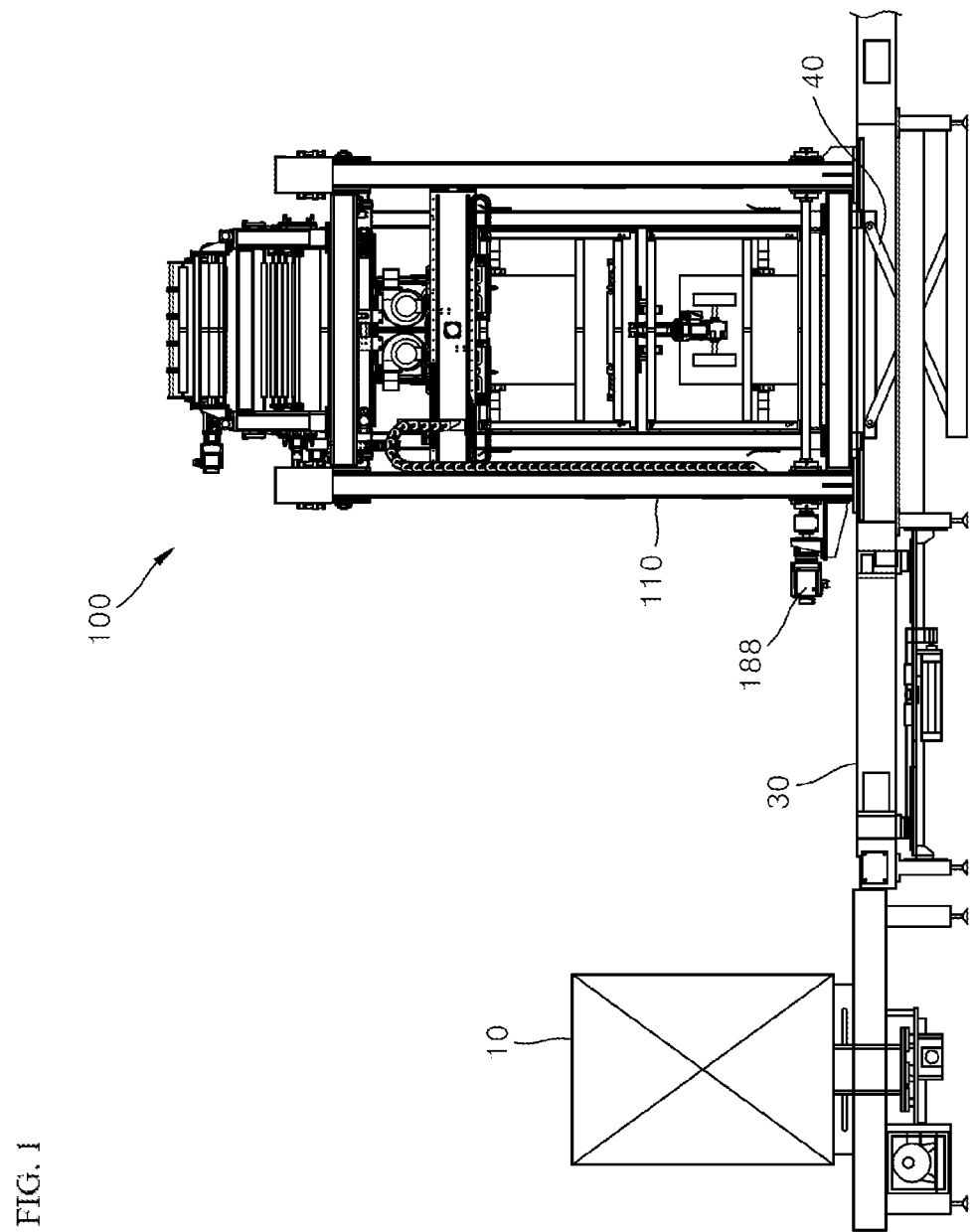
FIG. 1 is a side view illustrating a state in which a film wrapping machine for a product packing device using a stretch film is installed according to an embodiment of the present invention.
Figure 2:
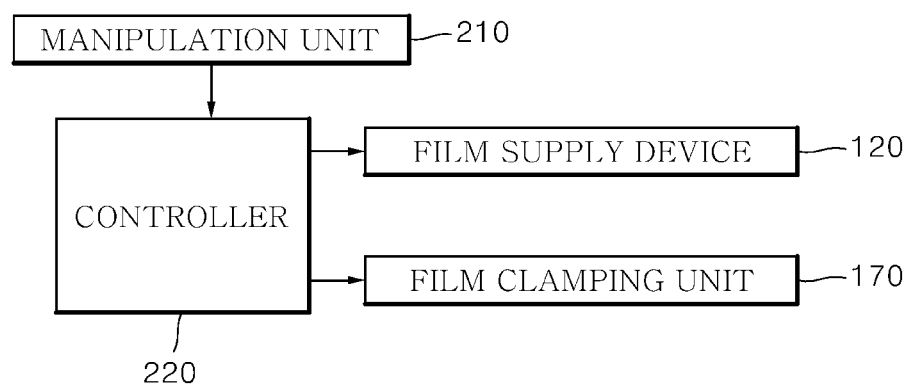
FIG. 2 is a block diagram illustrating a control system of the film wrapping machine of FIG. 1.
Figure 3:
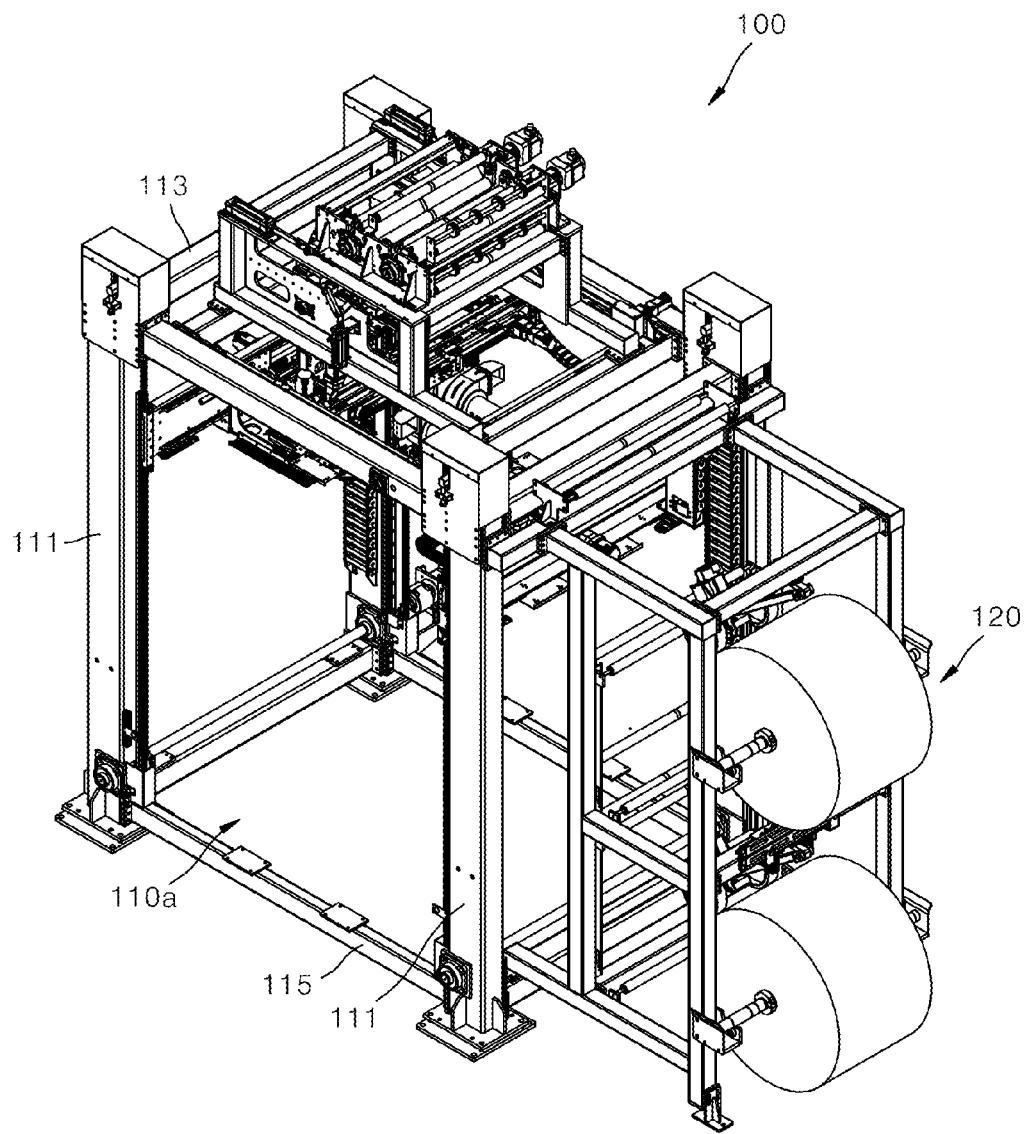
FIG. 3 is an enlarged perspective view of the film wrapping machine of FIG. 1.
Figure 4:
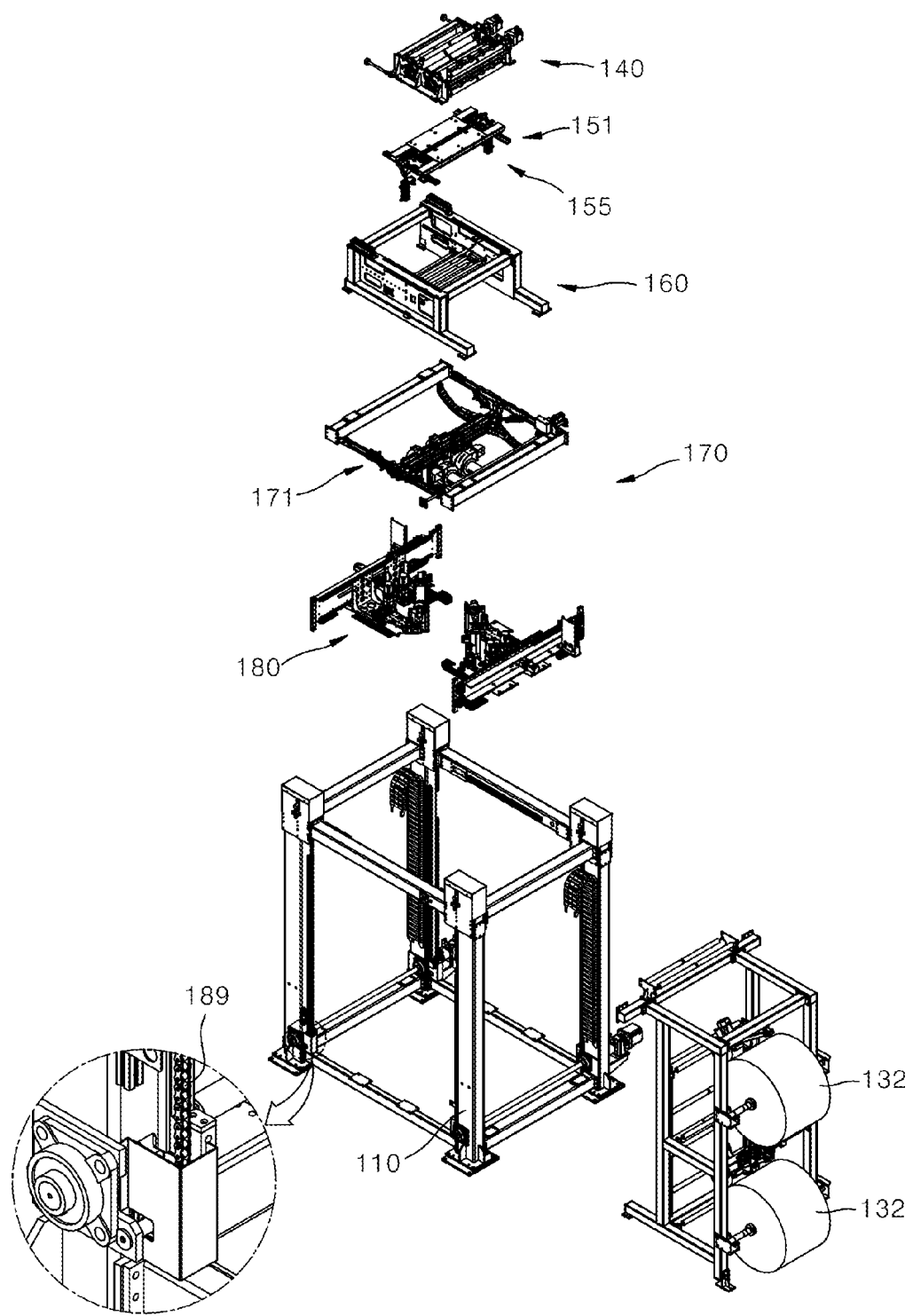
FIG. 4 is an exploded perspective view of the film wrapping machine of FIG. 3.
Figure 5:
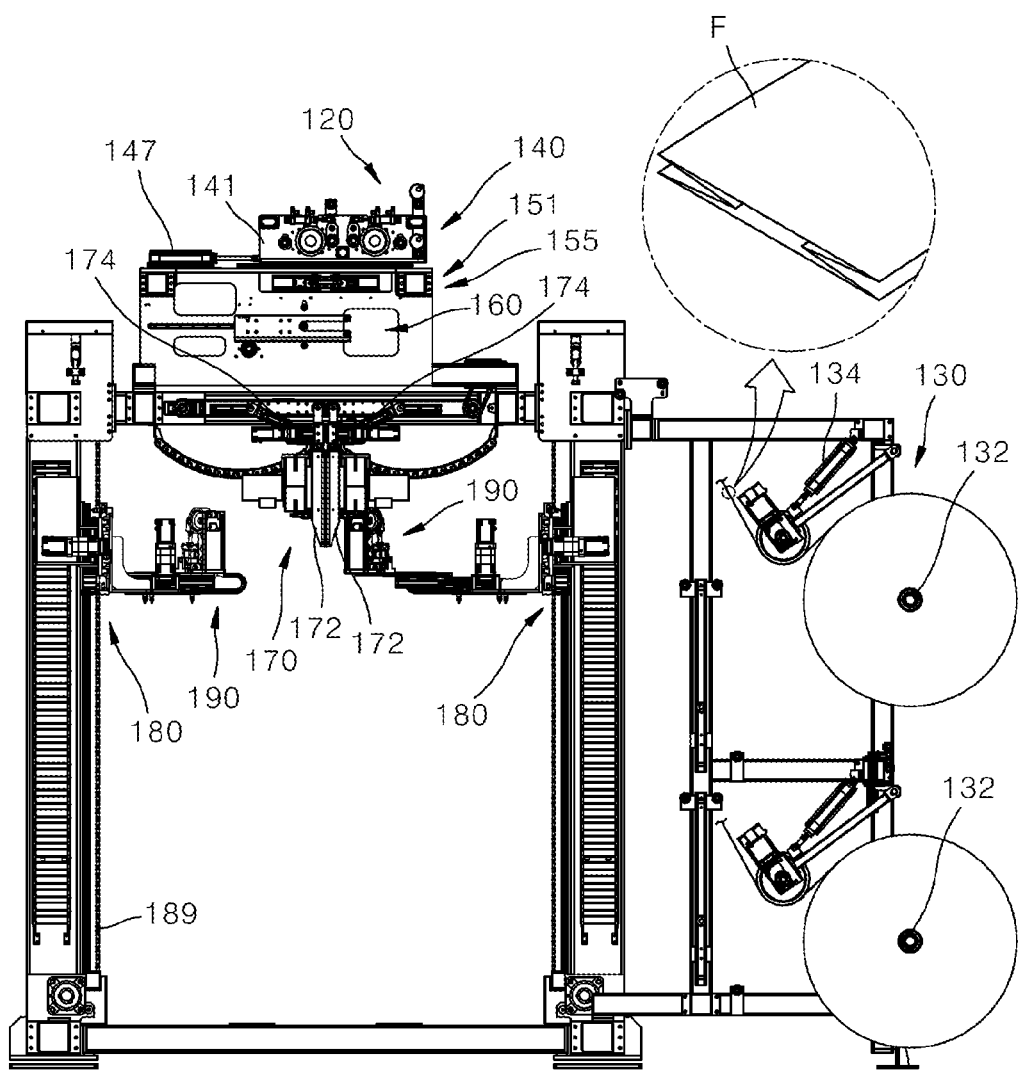
FIG. 5 is a side cross-sectional view illustrating that the film wrapping machine of FIG. 3 is cut at another angle.

FIG. 1 is a side view illustrating a state in which a film wrapping machine for a product packing device using a stretch film is installed according to the present invention, FIG. 2 is a block diagram illustrating a control system of the film wrapping machine of FIG. 1, FIG. 3 is an enlarged perspective view of the film wrapping machine of FIG. 1, FIG. 4 is an exploded perspective view of the film wrapping machine of FIG. 3, and FIG. 5 is a side cross-sectional view illustrating that the film wrapping machine of FIG. 3 is cut at another angle.

Referring to FIGS. 1 to 5, a film wrapping machine 100 for a product packing device using a stretch film according to the present invention includes a frame 110, a film supply device 120, a film clamping unit 170, and a controller 220.

The frame 110 has a structure in which vertical bars 111 extend upward and are spaced apart from each other such that a lower portion thereof has a movement permissible space 110a in which a refrigerator 10 applied as an example of a product to be wrapped may be introduced. In the illustrated example, the frame 110 is formed in the form of a quadrangular frame in which four vertical bars 111 extend vertically and an interior thereof is empty due to upper connection bars 113 connecting upper ends to each other and lower connection bars 115 connecting lower ends to each other.

The film supply device 120 has both sides folded inward to have a flat band shape so that an inner space is formed in a longitudinal direction, and supplies a tube-shaped stretch film F to the film clamping unit 170 which will be described below.

The film supply device 120 includes a film providing unit 130, a film feeding unit 140, a film cutting unit 151, a film fusion unit 155, and a wrapping length adjustment unit 160.

The film providing unit 130 supplies the stretch film F drawn out from a film winding roller 132, on which the stretch film F is wound and which is rotatably installed on the frame 110, along a film supply path to the film feeding unit 140. Reference numeral 134 denotes a cylinder for tension adjustment, which is installed on the film supply path to be moved forward and rearward and adjusts the tension of the stretch film F. In the illustrated example, a structure, in which two film winding rollers 132 are mounted vertically apart from each other, is applied so that each of stretch films F having different sizes may be selectively used.

Figure 6:
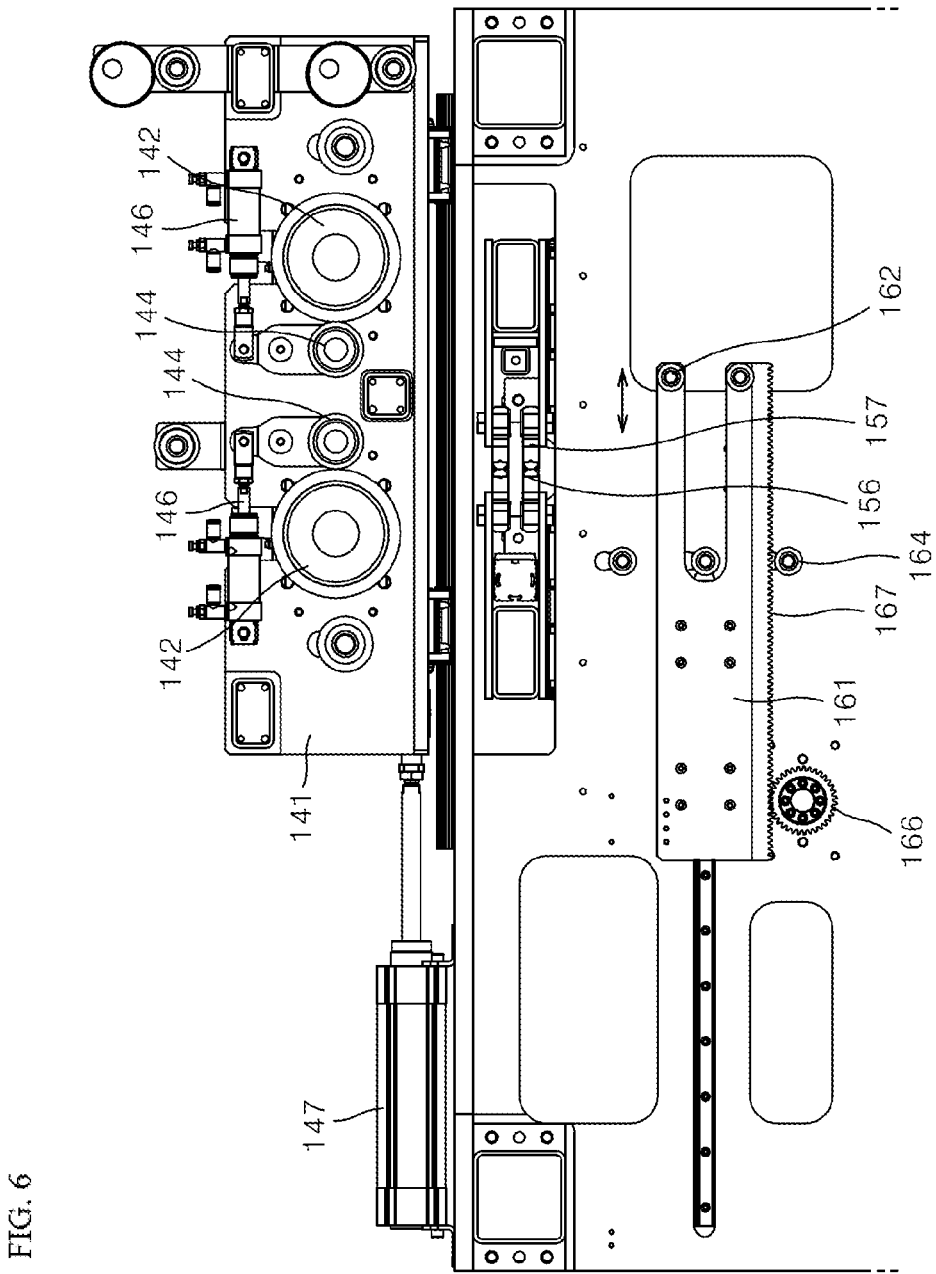
FIG. 6 is a partially enlarged view of a film feeding unit of FIG. 5.
Figure 7:
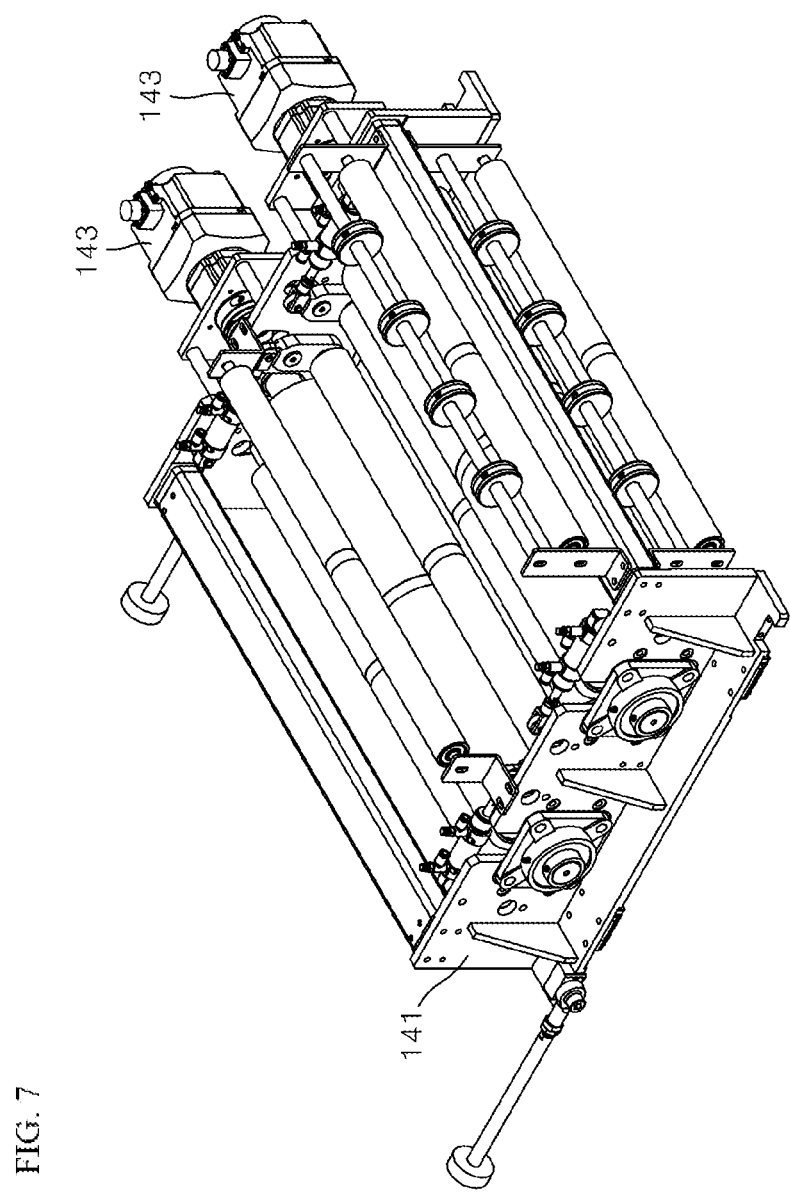
FIG. 7 is a perspective view illustrating the film feeding unit included in FIG. 5.

The film feeding unit 140 will be described with reference to FIGS. 6 and 7 together.

The stretch film F unwound from the film winding roller 132 is interposed between a driving roller 142 which is rotatably mounted on a feeding bracket 141 slidably mounted above the frame 110 and a driven roller 144 which is pressed against the driving roller 142 and rotates by friction, and thus the film feeding unit 140 is configured to move the stretch film F forward or rearward according to a direction of rotation of the driving roller 142 by a frictional rotational force. In the illustrated example, a pair of driving rollers 142 and driven rollers 144 are arranged apart from each other, and the stretch film F supplied by any one of the driving rollers 142 and the driven rollers 144 is selected and supplied to the film clamping unit 170 thereunder by a forward and rearward cylinder 147 that moves the feeding bracket 141 forward and rearward.

Reference numeral 146 denotes a first cylinder that controls the driven rollers 144 to be brought into close contact with or separated from the driving roller 142, and reference numeral 143 denotes a first motor that rotationally drives the driving rollers 142.

Figure 8:
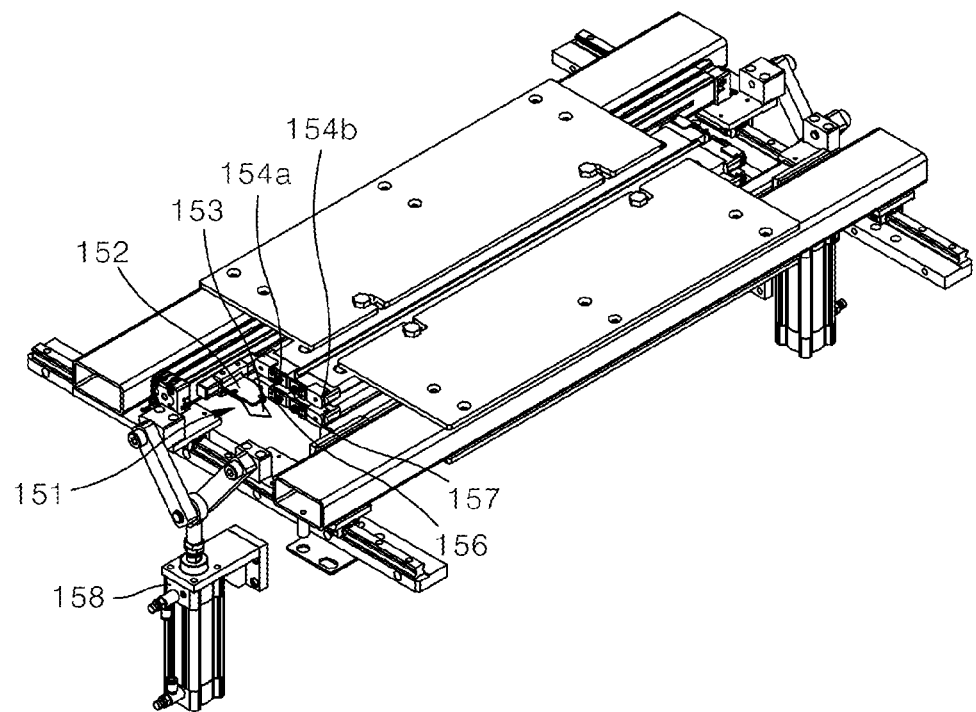
FIG. 8 is a perspective view illustrating a film cutting unit and a film fusion unit of FIG. 5.

The film cutting unit 151 is mounted under the film feeding unit 140 and cuts the stretch film F moved downward from the film feeding unit 140 to a set length, and will be described with additional reference to FIG. 8. In the film cutting unit 151, a cutter piece 152, on which a cutter 153 is mounted, may cut the stretch film F while moving in a direction crossing the stretch film F. As a moving structure of the cutter piece 152, various ways such as a rack and a pinion, forward and backward rotation of a belt, and the like may be applied.

The film fusion unit 155 will be described with reference to FIGS. 6 and 8 together.

The film fusion unit 155 is disposed under the film cutting unit 151 to be brought into close contact with and separated from each other, and heat-fuses a rear end portion of the stretch film F cut by first and second fusion pieces 156 and 157 having a built-in heater therein. Reference numeral 158 denotes a fusion control cylinder for moving the first and second fusion pieces 156 and 157 in opposite directions through links that are moved in opposite directions by forward or rearward movement of a rod thereof.

First and second holders 154*a* and 154*b*, which are interlocked with the first and second fusion pieces 156 and 157 above the film fusion unit 155 based on the film cutting unit 151 and are brought into close contact with and separated from each other, serve to hold the stretch film F during fusion and cutting of the stretch film F.

Figure 9:
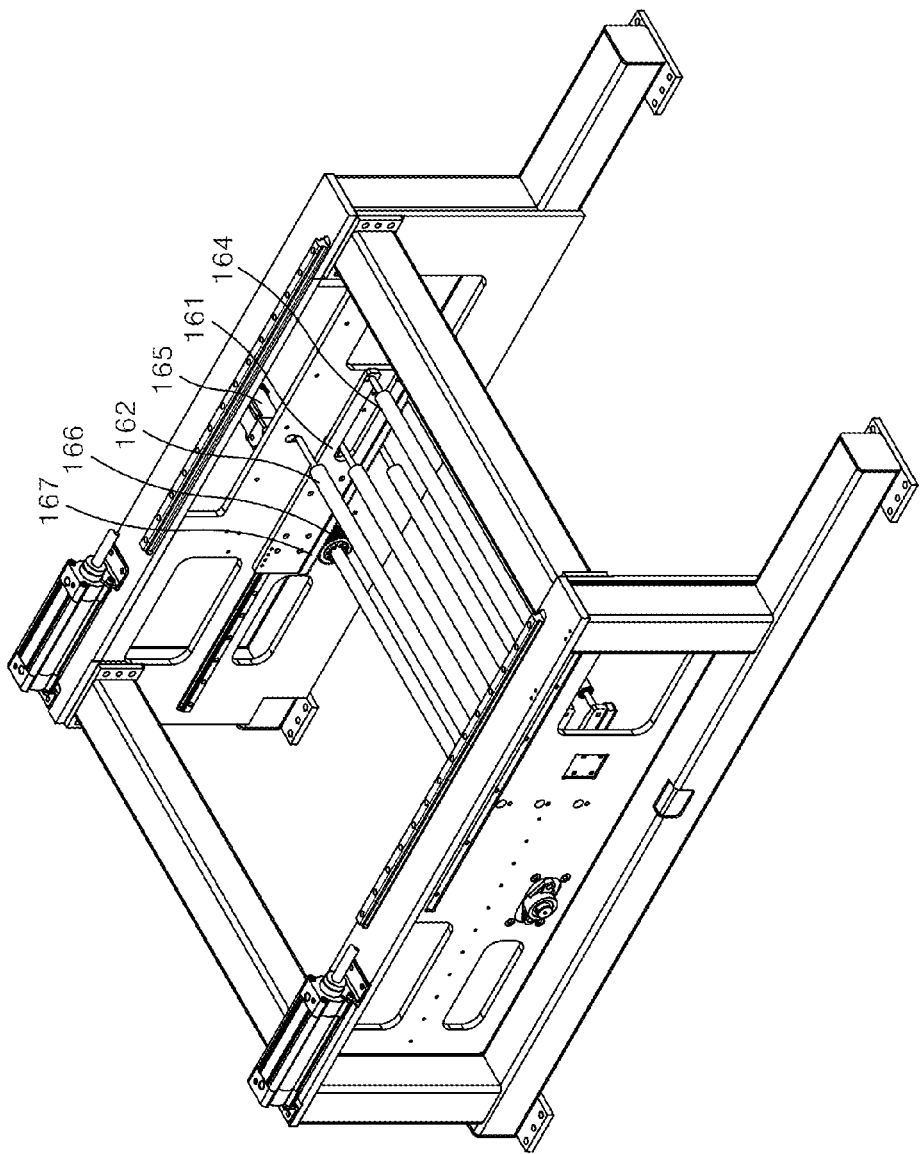
FIG. 9 is an enlarged perspective view of a wrapping length adjustment unit of FIG. 5.

The wrapping length adjustment unit 160 will be described with reference to FIGS. 6 and 9 together. The wrapping length adjustment unit 160 has a structure having a plurality of length securing rollers 162 disposed under the film fusion unit 155 to provide a movement path for the stretch film F to move in a zigzag pattern, and a length adjustment roller 164 that is movable relative to the length securing rollers 162. The length adjustment roller 164 is rotatably mounted on a slider 161 on which a rack gear 167 engaged with a pinion 166 rotated forward and backward by a length adjustment motor 165 is formed to be moved forward or rearward.

Here, the wrapping length is determined by adjusting a separation distance of the length securing roller 162 with respect to the length adjustment roller 164.

The film clamping unit 170 will be described with reference to FIGS. 10 to 14 together.

The film clamping unit 170 includes a film adsorption unit 171 which is mounted on the frame 110 and includes a pair of suction pads 172 which are moved in a direction of being spaced apart from each other in a state of adsorbing the stretch film F by vacuum pressure so that a front end portion of the stretch film F supplied downward through the wrapping length adjustment unit 160 of the film supply device 120 is opened, and includes a plurality of clamps 190 which grip the front end portion of the stretch film F opened by the suction pads 172, receive the stretch film F whose upper end is cut and bonded by the film supply device 120 in a wrinkled state, and process the stretch film F to be covered on the refrigerator 10 in a process of being lowered along the vertical bars 111.

Figure 10:
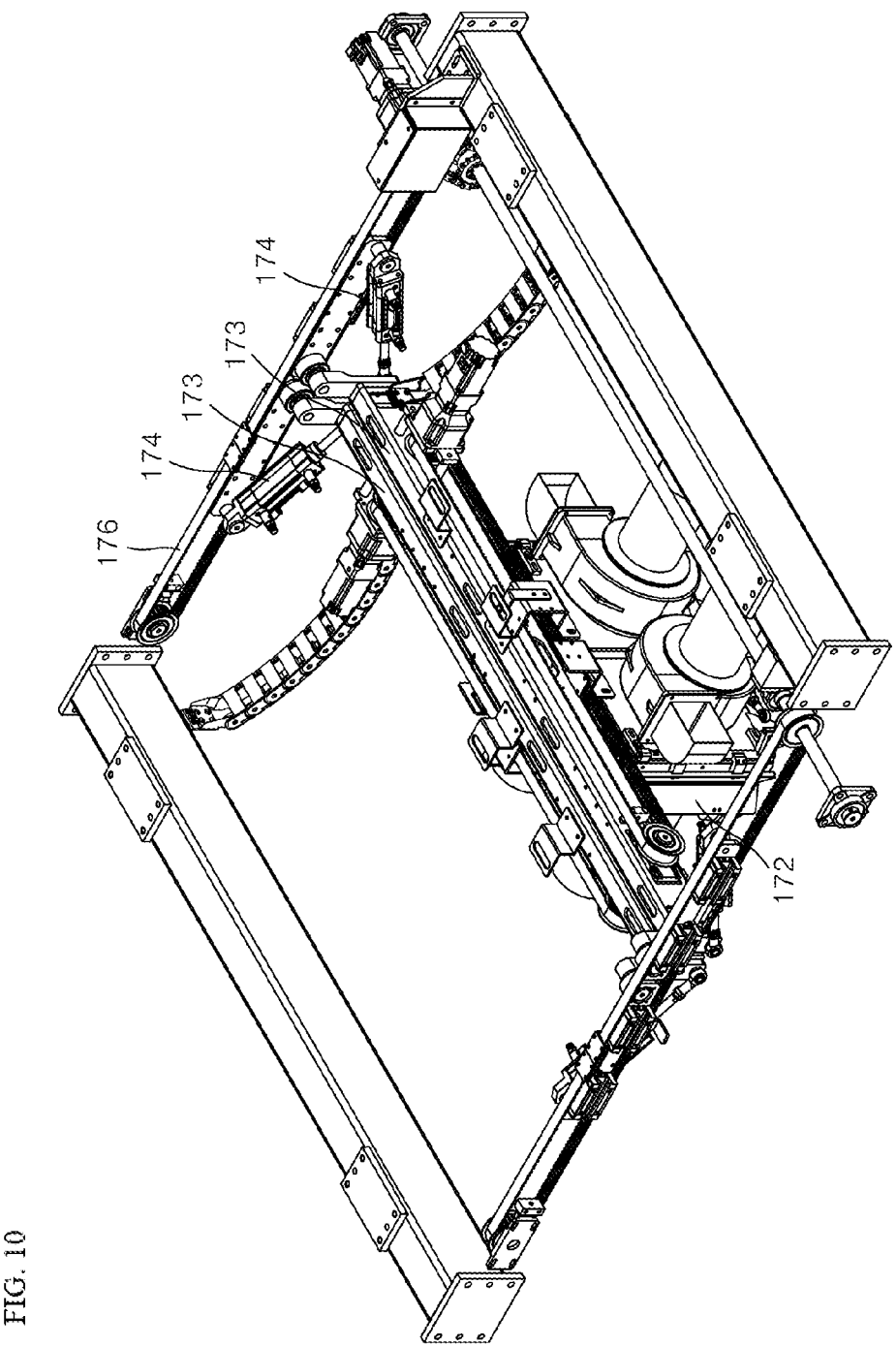
FIG. 10 is an enlarged perspective view of an adsorption portion of a film clamping unit of FIG. 5.
Figure 11:
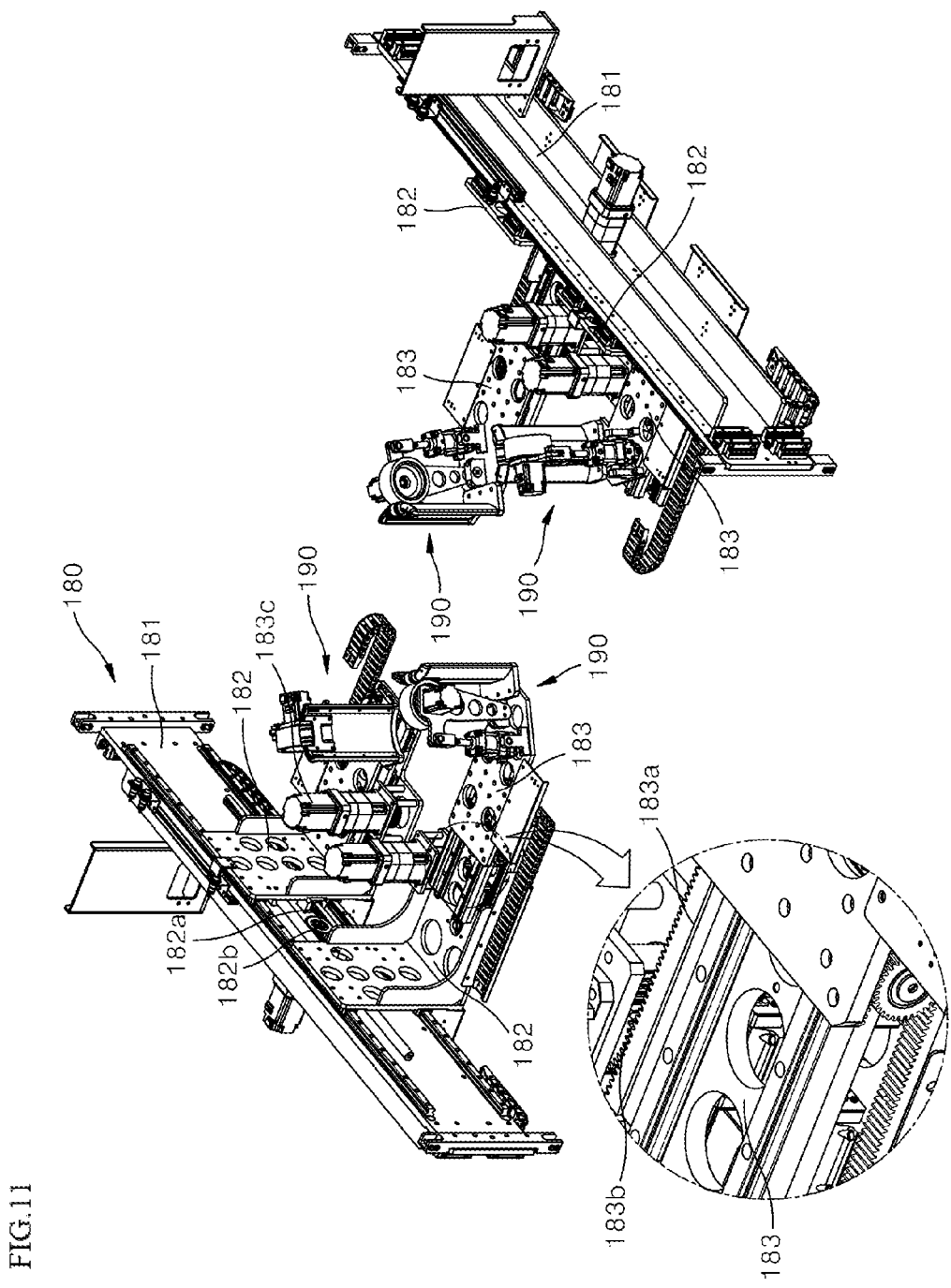
FIG. 11 is an enlarged perspective view of a clamping portion of the film clamping unit of FIG. 5.
Figure 12:
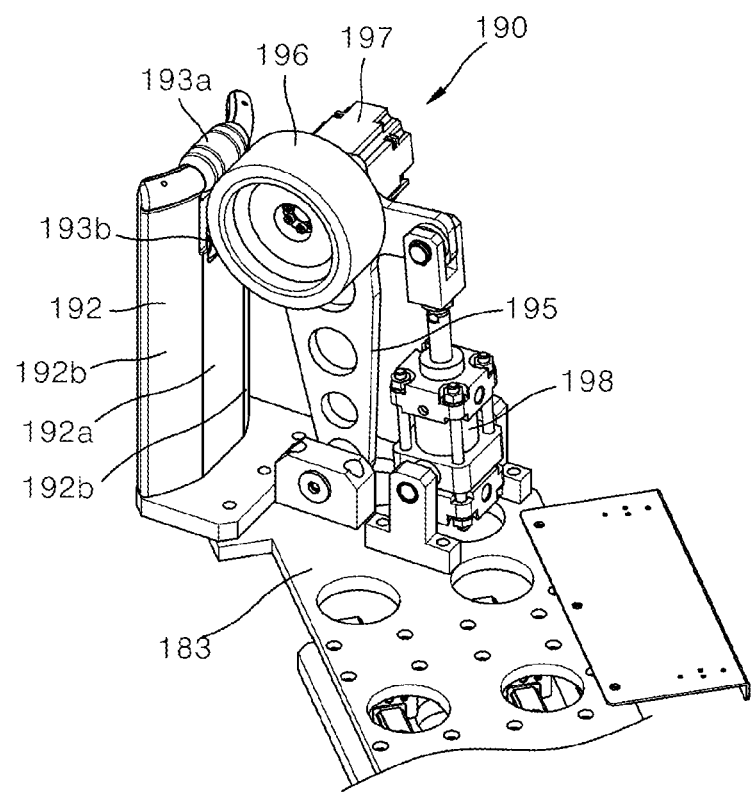
FIGS. 12 and 13 are perspective views illustrating a gripping state and a gripping release state of a clamp of FIG. 11.
Figure 13:
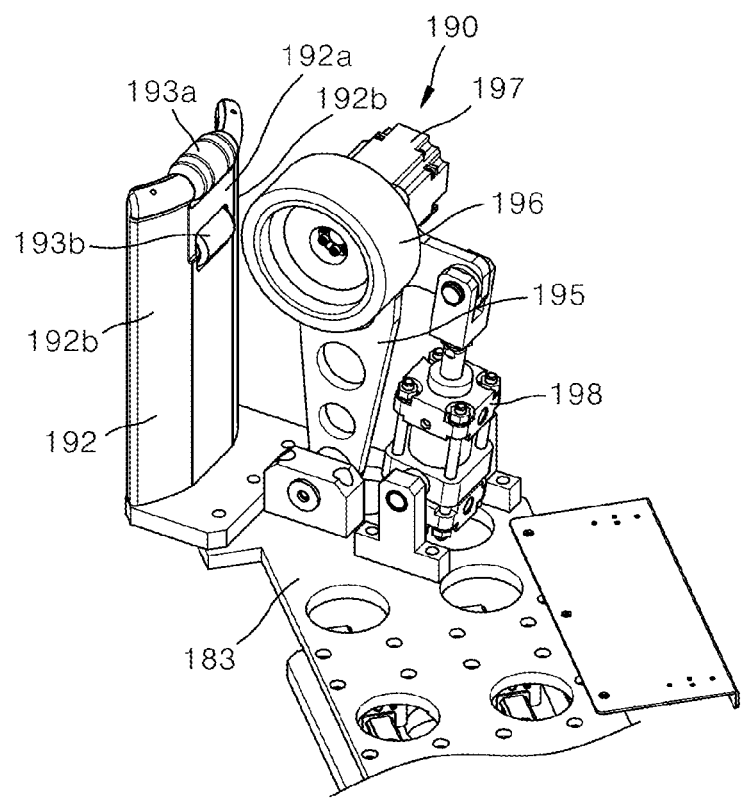

As illustrated in FIG. 10, the film adsorption unit 171 has a structure in which the suction pads 172 are mounted on extending support brackets 173 that are disposed opposite to each other on the frame 110 to enable positional movement. The support brackets 173 are brought into close contact with or separated from each to other by expansion and contraction of a rod of an adsorption adjustment cylinder 174. Further, the suction pads 172 are configured to enable positional movement on the support brackets 173 in an extension direction, which is a first direction, and are also configured to enable positional movement in a second direction orthogonal to the first direction.

Meanwhile, the clamps 190 are mounted on a lifting and lowering unit 180 of the film clamping unit 170 to be lifted or lowered through the vertical bars 111.

The lifting and lowering unit 180 includes a pair of lifting and lowering support plates 181, first horizontal moving plates 182, and a second horizontal moving plate 183.

Two lifting and lowering support plates 181 are each coupled to one of the vertical bars 111 by a chain 189 driven by a lifting and lowering motor 188 to be lifted or lowered.

Two first horizontal moving plates 182 are mounted movably on the lifting and lowering support plates 181 in opposite directions to each other in a first horizontal direction. The first horizontal moving plates 182 are mounted movably in opposite directions to each other by a rack 182*a* installed to extend in the first horizontal direction and a pinion 182*b* mounted on the lifting and lowering support plates 181 and engaged with the rack 182*a*.

The second horizontal moving plate 183 is movably mounted on the first horizontal moving plates 182 in a second horizontal direction orthogonal to the first horizontal direction. A rack gear 183*a* is formed on a side surface of the second horizontal moving plate 183, and a pinion gear 183*b* that is engaged with the rack gear 183*a* and rotated forward and backward is formed on the first horizontal moving plates 182. Reference numeral 183*c* denotes a motor mounted on the first horizontal moving plates 182 to rotate the pinion gear 183*b*.

The clamps 190 each includes an inner support plate 192, upper and lower inner finger rollers 193*a* and 193*b*, a rotating piece 195, a gripping roller 196, a gripping drive motor 197, and a clamping cylinder 198.

The inner support plate 192 is a portion extending vertically from an end edge of the second horizontal moving plate 183. The inner support plate 192 is formed to have a curved portion 192*b* extending to have an arc-shaped curvature so that a separation distance from the gripping roller 196 is further increased as a portion is further away from a central portion 192*a*, on which the upper and lower inner finger rollers 193*a* and 193*b* are mounted, toward both sides in order to suppress contact with the stretch film F.

The upper inner finger roller 193*a* is rotatably mounted to be brought into contact with an inner surface of the stretch film F opened at an upper end of the inner support plate 192.

The lower inner finger roller 193*b* is rotatably mounted on the inner support plate 192 at a position spaced downward from the upper inner finger roller 193*a*.

The rotating piece 195 is a portion of which a lower portion is hinge-coupled to the second horizontal moving plate 183 at a position spaced apart from the inner support plate 192 and is installed to be rotated in a direction of being brought into contact with or separated from the upper and lower inner finger rollers 193*a* and 193*b*.

The gripping roller 196 is rotatably coupled to the rotating piece 195 and has an outer diameter that may be brought into contact with and separated from the upper and lower inner finger rollers 193*a* and 193*b*.

The gripping drive motor 197 drives the gripping roller 196 to be rotated forward or rearward.

The clamping cylinder 198 has a rod that is moved forward or rearward so as to rotate the rotating piece 195 in a direction in which the gripping roller 196 is brought into contact with the upper and lower inner finger rollers 193*a* and 193*b* or in a direction in which the gripping roller 196 is separated from the upper and lower inner finger rollers 193*a* and 193*b* and that is coupled to the rotating piece 195, and the clamping cylinder 198 is mounted on the second horizontal moving plate 183.

Figure 17:
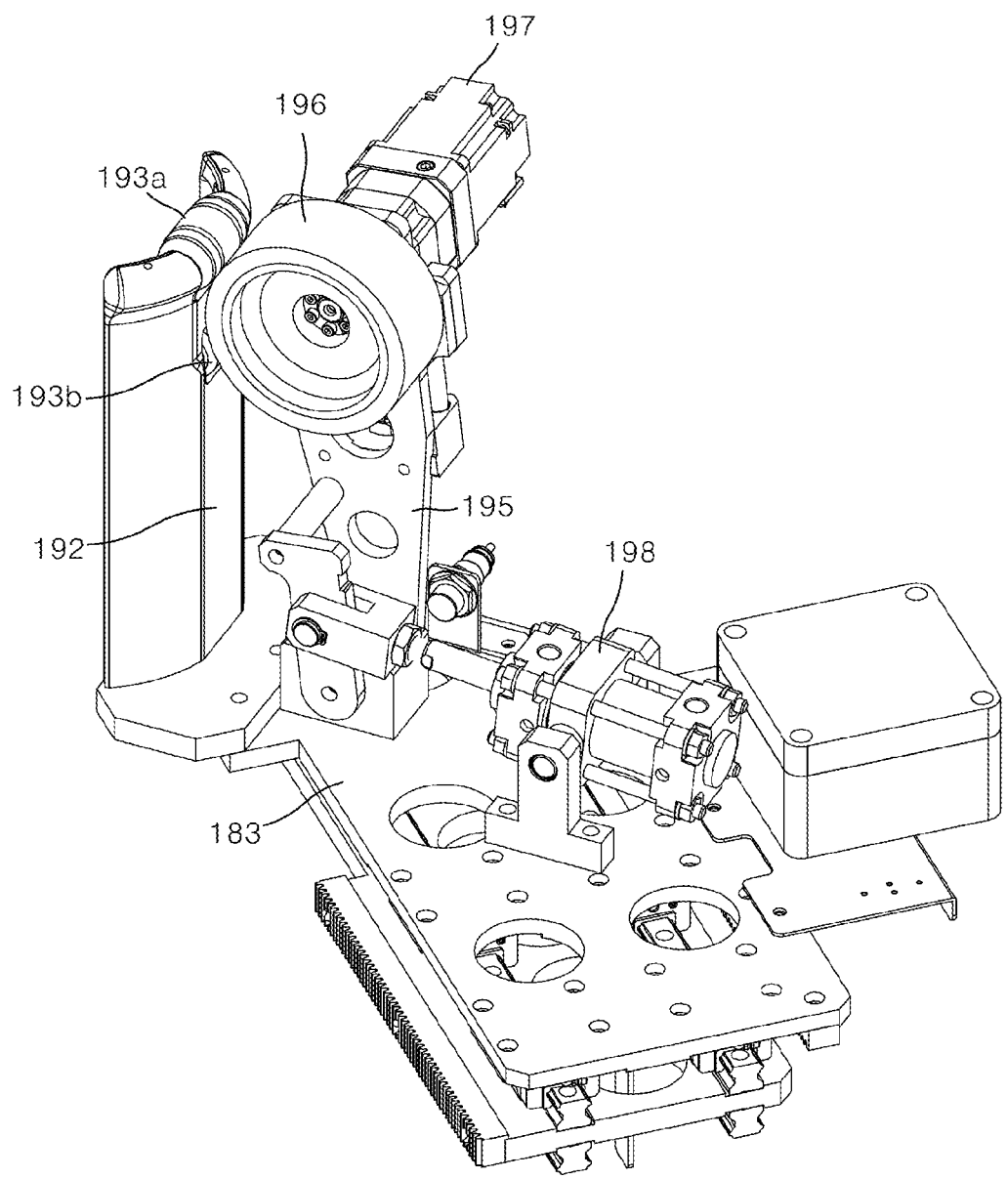
FIG. 17 is a perspective view illustrating a clamp structure according to still another embodiment of the present invention.
Figure 18:
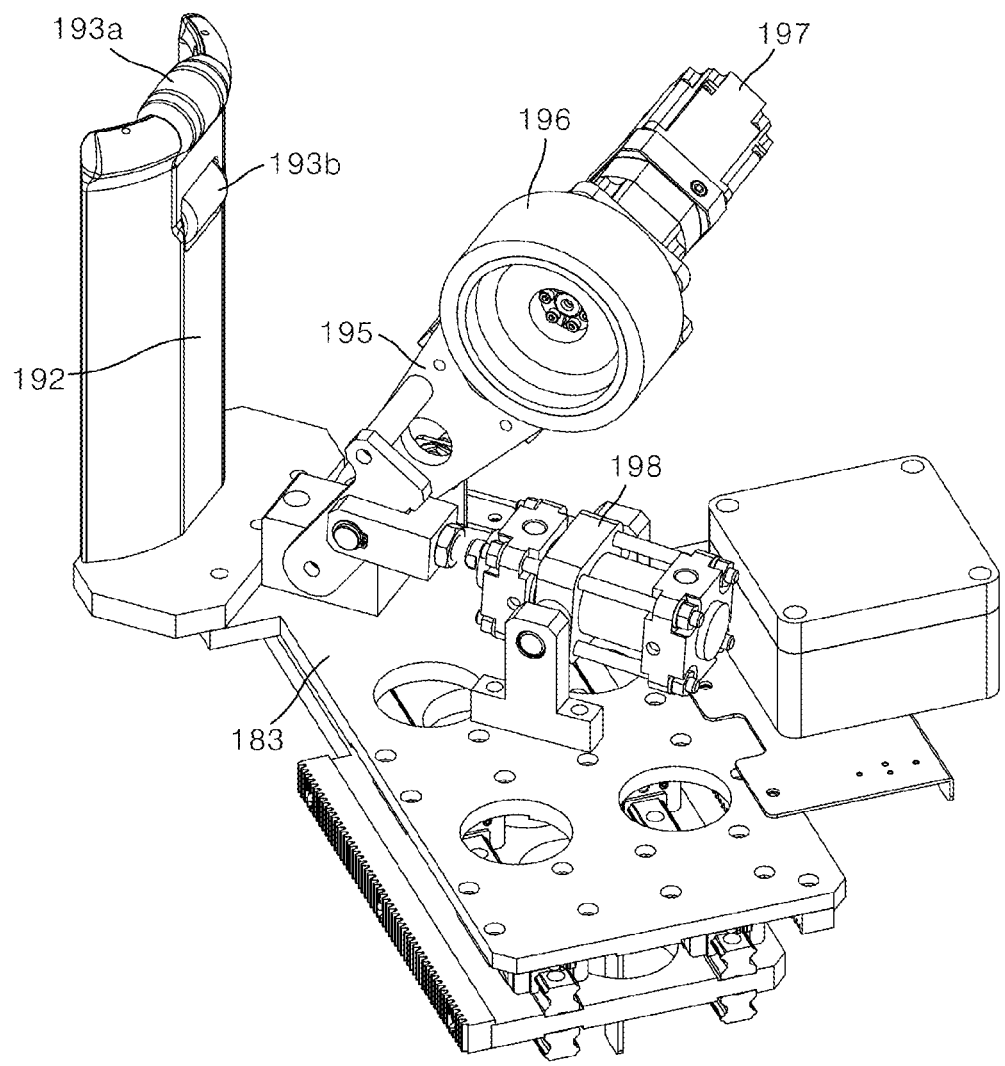
FIG. 18 is a perspective view illustrating a gripping roller of FIG. 17 in a gripping release state.

Unlike the illustrated example, as can be seen with reference to FIGS. 17 and 18, the clamping cylinder 198 may be mounted horizontally to rotate the rotating piece 195 in a direction in which the gripping roller 196 is brought into contact with the upper and lower inner finger rollers 193a and 193b or in a direction in which the gripping roller 196 is separated from the upper and lower inner finger rollers 193a and 193b by the forward or rearward movement of the rod thereof.

Figure 14:
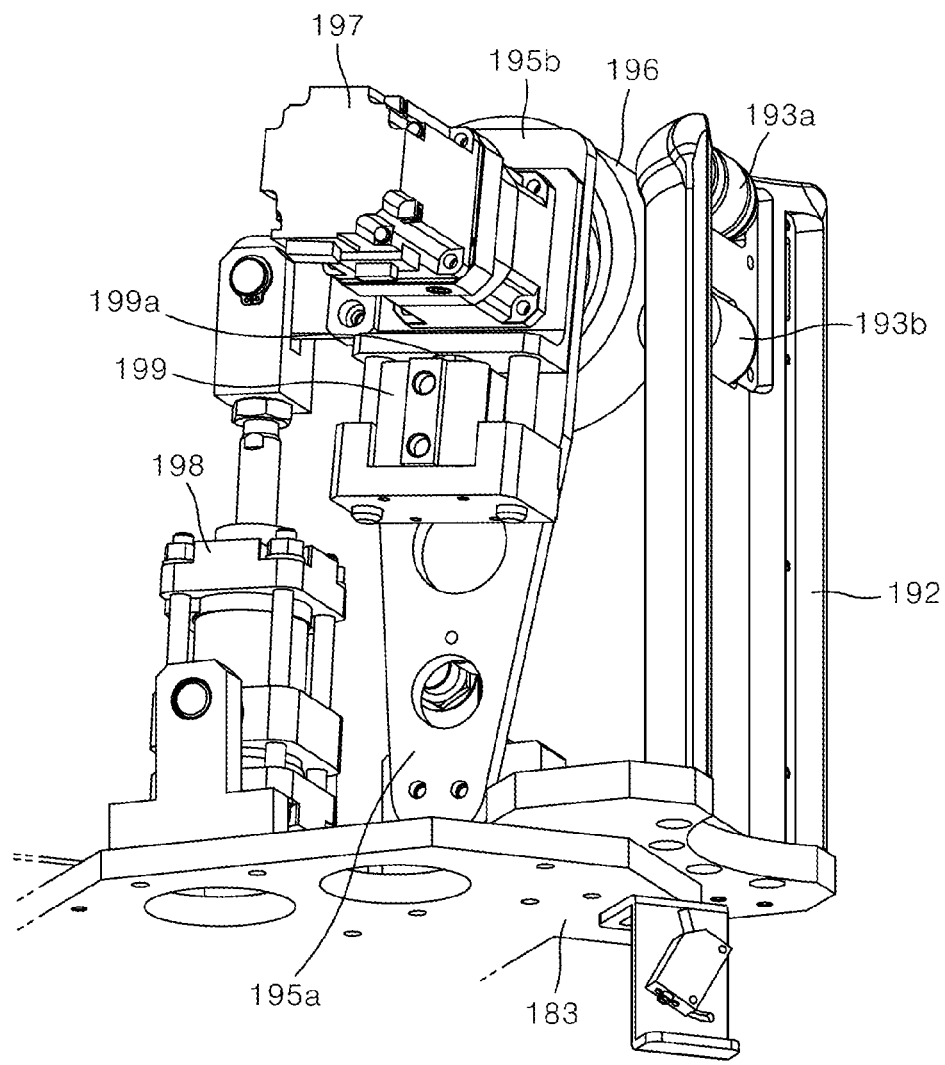
FIG. 14 is a perspective view illustrating a clamp structure according to another embodiment of the present invention.

Meanwhile, when the stretch film F is accommodated under the lower inner finger roller 193b in a wrinkled manner, all of the gripping roller 196 and the upper and lower inner finger rollers 193a and 193b may be rotated to be brought into contact with each other, and in a process of being lowered along the vertical bars 111 so that the products are covered with the stretch film F, only the gripping roller 196 and the upper inner finger roller 193a may be rotated to be brought into contact with each other, and thus the stretch film F may be suppressed from being rolled up by the lower inner finger roller 193b, and an example thereof will be described with reference to FIG. 14. Components having the same function as in the drawings illustrated above are denoted by the same reference numerals.

Referring to FIG. 14, the rotating piece 195 includes a main rotating piece 195a having a lower portion hinge-coupled to the second horizontal moving plate 183 and extending upward, and a sub-rotating piece 195b connected to a rod 199a of a lifting and lowering cylinder 199 so as to be vertically movable with respect to the main rotating piece 195a.

Further, the gripping drive motor 197 and the gripping roller 196 are mounted on the sub-rotating piece 195b and a main body of the lifting and lowering cylinder 199 is mounted on the main rotating piece 195a. The lifting and lowering of the sub-rotating piece 195b is guided through guide rods provided on both sides around the rod 199a of the lifting and lowering cylinder 199.

Figure 15:
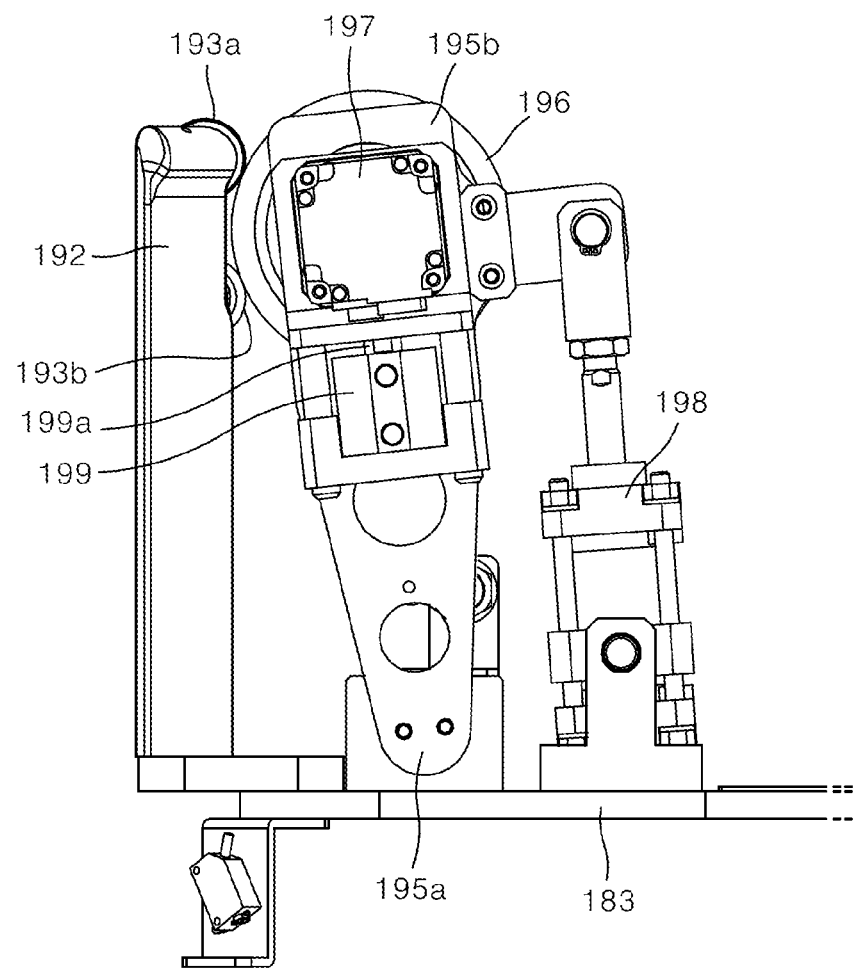
FIG. 15 is a side view illustrating that a state in which a gripping roller of FIG. 14 in contact with both of upper and lower inner finger rollers is maintained.
Figure 16:
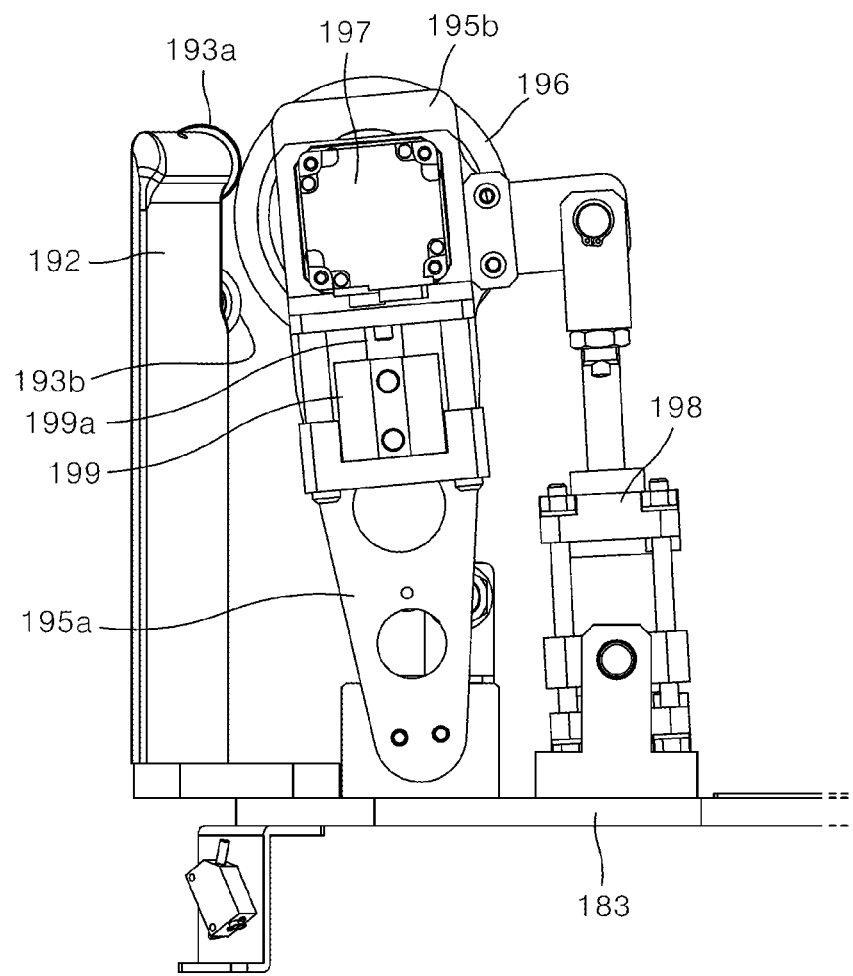
FIG. 16 is a side view illustrating that a state in which the gripping roller of FIG. 14 in contact with the upper inner finger roller is maintained.

Therefore, in a state in which the rod 199a of the lifting and lowering cylinder 199 mounted on the main rotating piece 195a is returned to an initial position, all of the gripping roller 196 and the upper and lower inner finger rollers 193a and 193b enter a state of being rotated while being in contact with each other, as illustrated in FIG. 15, and in a state in which the rod 199a of the lifting and lowering cylinder 199 with the main body mounted on the main rotating piece 195a is raised from the initial position, only the gripping roller 196 and the upper inner finger roller 193a enter a state of being rotated while being in contact with each other, as illustrated in FIG. 16.

In this case, when the gripping roller 196 is rotated so that the stretch film F is accommodated under the inner finger roller 193b in a wrinkled manner, the controller 220 only needs to control the clamping cylinder 198 so that all of the gripping roller 196 and the upper and lower inner finger rollers 193a and 193b are brought into contact with each other, and in the process of covering the product with the stretch film F in the process of being lowered along the vertical bars 111, the controller 220 only needs to control the lifting and lowering cylinder 199 so that only the gripping roller 196 and the upper inner finger roller 193a are brought into contact with each other.

A manipulation unit 210 is configured to set supported functions.

The controller 220 controls the stretch film F to be supplied from the film winding roller 132 of the film supply device 120 selected through the manipulation unit 210, controls the rotation of the driving roller 142 corresponding to the selected film winding roller 132, and controls the operation of the film cutting unit 151 and the film fusion unit 155. Further, the controller 220 controls the operation of the film clamping unit 170 and the film supply device 120 so that the clamps 190 of the film clamping unit 170 are lowered along the vertical bars 111 in a state in which the clamps 190 grip the stretch film F, and the clamps 190 are raised along the vertical bars 111 in a state in which the gripping of the stretch film F by the clamps 190 is released.

Hereinafter, the process of wrapping, by the controller 220, with the stretch film will be described in more detail.

First, the controller 220 controls the stretch film F wound around the film winding roller 132 to pass through between the driven rollers 144, and the film cutting unit 151, the film fusion unit 155, and the wrapping length adjustment unit 160 by the driving of the driving roller 142 and proceed to lower portions of the suction pads 172, and then maintains a state in which the stretch film F is adsorbed with the suction pads 172. When a set wrapping length is satisfied by controlling the wrapping length adjustment unit 160, the controller 220 processes so that the fusion by the film fusion unit 155 and the cutting by the film cutting unit 151 are achieved.

Through this process, a unit wrapping bag in which a rear end is cut and fused and a front end is opened is formed. Thereafter, the controller 220 moves the suction pads 172 to be spaced apart from each other, controls the upper and lower inner finger rollers 193a and 193b of the clamps 190 to be disposed inside the stretch film F adsorbed by the suction pads 172, and then controls the gripping roller 196 to roll the stretch film F disposed between the upper and lower inner finger rollers 193a and 193b downward by frictional contact, and releases the adsorption state of the suction pads 172. Through this process, the unit wrapping bag is accommodated and processed in a space between the inner support plate 192 and a bottom surface of the second horizontal moving plate 183.

Thereafter, when the refrigerator 10 reaches a wrapping position by a transfer conveyor 30 provided under the film wrapping machine 100, the controller 220 moves the clamps 190 to be spaced apart from each other by a width, which allows the refrigerator 10 to be surrounded by the stretch film F, to expand the stretch film F, lowers the lifting and lowering unit 180 to a position of a lower portion of the refrigerator 10, releases the gripping state of the stretch film F of the clamps 190, and processes the lifting and lowering unit 180 to be raised to the initial position. Then, the stretch film F is wrapped in a state of being in close contact with the refrigerator 10 while being contracted to the initial state. In such a wrapping process, the refrigerator 10, which reaches the wrapping position and maintains a stationary state, is controlled by a floating device 40 to maintain a lifting state at a certain height higher than the transfer conveyor 30, and then, when the wrapping process is completed, the refrigerator 10 is lowered again and processed to be transferred by the transfer conveyor 30.

In the above description, although the product to be wrapped is illustrated as a refrigerator, the present invention can be used for wrapping various products such as dryers and the like with a stretch film.

According to the film wrapping machine for a product packing device using the stretch film described above, products can be wrapped by applying a stretch film, thereby improving the efficiency of a packing operation.

What is claimed is:

1. A film wrapping machine for a product packing device using a stretch film, which covers a product with the stretch film supplied from a film supply device which has both side surfaces folded inward to have a flat band shape so that an inner space is formed in a longitudinal direction and supplies a tube-shaped stretch film, the film wrapping machine comprising:

a frame having vertical bars extending upward and spaced apart from each other such that a lower portion thereof has a movement permissible space in which a product to be wrapped is introduced;

a film clamping unit including a pair of suction pads which are moved in a direction of being spaced apart from each other in a state of adsorbing the stretch film by vacuum pressure so that a front end portion of the stretch film supplied from the film supply device is opened, and a plurality of clamps configured to grip the front end portion of the stretch film opened by the suction pads, receive the stretch film whose upper end is cut and bonded by the film supply device in a wrinkled state, and process the stretch film to be covered on a product in a process of being lowered along the vertical bars; and a controller configured to control operation of the film clamping unit and the film supply device so that the clamps of the film clamping unit are lowered along the vertical bars in a state in which the clamps grip the stretch film and the clamps are raised along the vertical bars in a state in which the gripping of the stretch film is released, wherein the film clamping unit includes:

a pair of lifting and lowering support plates each coupled to one of the vertical bars to be lifted or lowered;

a pair of first horizontal moving plates mounted movably on the lifting and lowering support plates in opposite directions to each other in a first horizontal direction; and a second horizontal moving plate mounted movably on the first horizontal moving plates in a second horizontal direction orthogonal to the first horizontal direction, wherein the clamps each include at least one inner finger roller rotatably mounted to be brought into contact with an inner surface of the stretch film opened at an upper end of the inner support plate extending vertically from an end edge of the second horizontal moving plate, a rotating piece having a lower portion which is hinge-coupled to the second horizontal moving plate at a position spaced apart from the inner support plate and is installed to be rotated in a direction of being brought into contact with or separated from the inner finger roller, a gripping roller which is rotatably coupled to the rotating piece and is brought into contact with or separated from the inner finger roller, a gripping drive motor configured to drive the gripping roller to be rotated forward and backward, and a clamping cylinder having a rod that is moved forward or rearward so as to rotate the rotating piece in a direction in which the gripping roller is brought into contact with the inner finger roller or in a direction in which the gripping roller is separated from the finger roller and that is coupled to the rotating piece.

2. The film wrapping machine of claim 1, wherein the inner support plate is formed to have a curved portion extending to have an arc-shaped curvature so that a separation distance from the gripping roller is further increased as a portion is further away from a central portion, on which the inner finger roller is mounted, toward both sides.

3. The film wrapping machine of claim 2, wherein the film supply device includes:

a film providing unit which includes a film winding roller, on which the stretch film is wound and which is rotatably installed, and is configured to supply the stretch film drawn out from the film winding roller along a film supply path;

a film feeding unit configured to, when the stretch film unwound from the film winding roller is interposed between a driving roller which is rotatably mounted on the frame and a driven roller which is pressed against the driving roller and rotates by friction, move the stretch film forward or rearward according to a direction of rotation of the driving roller by a frictional rotational force;

a film cutting unit configured to cut the stretch film moved downward from the film feeding unit to a set length; and a film fusion unit configured to heat-fuse a rear end portion of the stretch film cut by the film cutting unit, wherein the controller controls the rotation of the driving roller and controls operation of the film cutting unit and the film fusion unit.

4. The film wrapping machine of claim 1, wherein the inner finger roller includes:

an upper inner finger roller rotatably mounted to be brought into contact with the inner surface of the stretch film opened at the upper end of the inner support plate extending vertically from the end edge of the second horizontal moving plate; and a lower inner finger roller rotatably mounted on the inner support plate at a position spaced downward from the upper inner finger roller, wherein the rotating piece includes a main rotating piece having a lower portion hinge-coupled to the second horizontal moving plate and extending upward, and a sub-rotating piece connected to a rod of a lifting and lowering cylinder so as to be vertically movable with respect to the main rotating piece, the gripping drive motor and the gripping roller are mounted on the sub-rotating piece, and the controller controls the clamping cylinder so that all of the gripping roller and the upper and lower inner finger rollers are brought into contact with each other when the gripping roller is rotated so that the stretch film is accommodated under the inner finger roller in a wrinkled manner, and controls the lifting and lowering cylinder so that only the gripping roller and the upper inner finger roller are brought into contact with each other in a process of covering the product with the stretch film in the process of being lowered along the vertical bars.

* * * * *